United States Patent [19]
Zeldman et al.

[11] 3,745,851
[45] July 17, 1973

[54] POWER TOOTHED TRANSMISSION DEVICE

[75] Inventors: Maurice I. Zeldman; Glen W. Lindemann; Murali Mahidhara, all of Pittsburgh, Pa.

[73] Assignee: North American Rockwell Corporation, Pittsburgh, Pa.

[22] Filed: Dec. 23, 1971

[21] Appl. No.: 211,389

[52] U.S. Cl. .................. 74/434, 29/159.2, 74/243 R
[51] Int. Cl. ..... F16h 55/04, B21d 53/28, B21k 1/30
[58] Field of Search ......................... 74/243 R, 434; 29/159.2, 159 R

[56] References Cited
UNITED STATES PATENTS

| | | | |
|---|---|---|---|
| 3,552,167 | 1/1971 | Bergi et al. | 29/159.2 X |
| 2,906,147 | 9/1959 | Pelphrey | 72/105 |
| 3,533,258 | 10/1970 | Leonard, Jr. et al. | 29/159.2 X |
| 3,580,027 | 5/1971 | Daniel | 29/159.2 X |
| 3,631,704 | 1/1972 | Leonard et al. | 29/159.2 X |
| 3,677,051 | 7/1972 | Schmidt | 29/159.2 X |

*Primary Examiner*—Leonard H. Gerin
*Attorney*—John R. Bronaugh et al.

[57] ABSTRACT

A toothed power transmission device comprising a centrally disposed web portion, completely cold formed teeth on the periphery of said web portion, said teeth having a laterally extending continuous cold formed working surface and a method of manufacturing a power toothed transmission device comprising the steps of selecting a substantially circular blank having a center hole, mounting said blank at its center hole on a rotatable mandrel, rotating said blank with rotating forming tools, contacting said forming tools with said blank to completely cold form finished teeth on said blank, whereby the blank material so contacted by said forming tools cold flows both axially and radially to form a laterally extending continuous cold formed working surface.

7 Claims, 4 Drawing Figures

PATENTED JUL 17 1973

3,745,851

POWER TOOTHED TRANSMISSION DEVICE

BACKGROUND OF THE INVENTION

This invention relates generally to power transmission devices. In particular, this invention is concerned with an improved sprocket formed with an integral web having teeth on its periphery, the teeth having a "ribbon" of cold worked steel.

A sprocket as well as other similar type of toothed power transmission devices transmit their forces and accommodates their load through their working teeth. The ability of the working teeth to transmit these forces will depend on their shape, size and location. The remaining portion (i.e., web portion) of the sprocket serves the exclusive function of allowing the power to be transmitted to or away from a shaft or other like power member. Accordingly, in theory, one merely has to provide a band of working teeth, dispose this band of teeth at some given diameter from a point and then fixedly attach the teeth to a rotatable power member such as a power shaft.

In theory, the problem of providing an improved, inexpensive, wear resistant sprocket having properly formed teeth appears simplistic of resolution but as yet a satisfactory approach has not been found. The prior art is replete with numerous sprocket configurations and sprocket manufacturing techniques which generally fail to meet the desired wear and cost standards. In particular, the prior art sprockets wear at an unacceptably high rate.

For example, U.s. Pat. No. 2,960,764 to Reichl discloses a method of making metal shapes having webs. In the broadest sense this patent discloses the formation of a web-like structure by utilizing a forcing filler piece into a preshaped blank through a series of passes on a conventional rolling mill. Such rolling mill might be of the type used to produce sheet steel. The product of the Reichl method is unsatisfactory in that it results in a very rough blank with inferior wear and performance characteristics which is unuseable in its finished form. The Reichl blank, therefore, requires additional extensive manufacturing processing before it becomes a marginally useable power transmission product.

U. S. Pat. No. 3,362,059 to DiPonio discloses a method of manufacturing gears having external teeth. DiPonio utilizes the classical approach of pre-hobbing the gear before the grear teeth are formed into their final shape. The pre-hobbing approach involves considerable material loss and as with the aforementioned Reichl method results in a marginal useable power transmission product.

In general, the prior art manufacturing techniques can be characterized as inferior, expensive and complex resulting in marginally useable power transmission products.

SUMMARY OF THE INVENTION

A primary object of the present invention, therefore, is the provision of a power transmission device, and in particular a sprocket member, which is inexpensive and simple to manufacture, and substantially wear resistant having superior metallurgical and wear characteristics.

An additional object of the invention is a toothed power transmission device comprising a centrally disposed web portion, completely cold formed teeth on the periphery of said web portion, said teeth having a laterally extending continuous cold formed working surface.

It is yet another object of the present invention to provide a method of manufacturing a power toothed transmission device comprising the steps of selecting a substantially circular blank having a center hole, mounting said blank at its center hole on a rotatable mandrel, rotating said blank with rotating forming tools, contacting said forming tools with said blank to completely cold form finished teeth on said blank, whereby the blank material so contacted by said forming tools cold flows both axially and radially to form a laterally extending continuous cold formed working surface.

It is yet another object of the present invention to provide a method of manufacturing a power toothed transmission device, and in particular a sprocket member, in which only a small amount of metal is wasted during the manufacturing process.

Still another object of the present invention is to provide a toothed power transmission device, and in particular a sprocket member, having an improved metal structure at the working surface of the teeth.

It is still another object of the present invention to provide a toothed power transmission device and in particular a sprocket member having a improved surface finish and more specifically a continuous cold formed laterally extending working surface essentially free of surface irregularities.

It is still another object of the present invention to provide a toothed power transmission device and in particular a sprocket member having improved hardness and more specifically a laterally extending working surface having a relatively high surface hardness.

It is still another ojbect of the present invention to provide a toothed power transmission device and more particularly a sprocket member having improved wear resistance, and more specifically a continuous cold formed laterally extending working surface having improved wear resistance characteristics.

A preferred embodiment of the toothed power transmission device and in particular to a toothed sprocket member is shown, along with an example of an apparatus to practice the method of manufacturing the sprocket member, by way of example in the accompanying drawings, without attempting to show all the various forms and modifications of the sprocket member or the various forms and modifications of the aforementioned apparatus; the invention being measured by the appended claims and not by the details of the specification.

DESCRIPTION OF THE INVENTION

Figure 1:
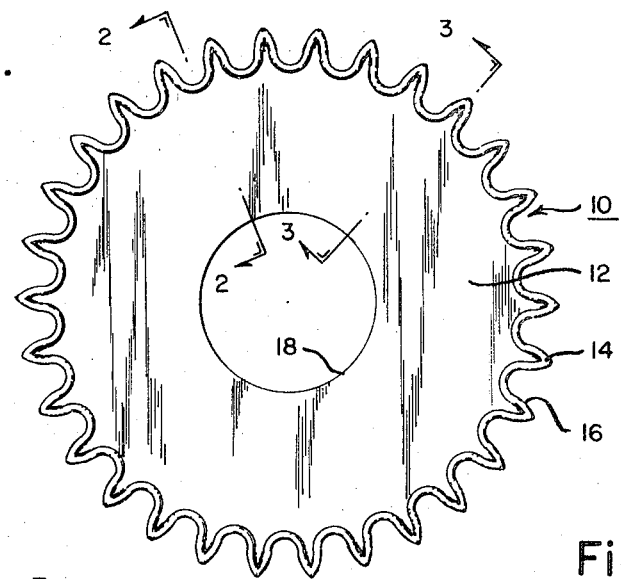
FIG. 1 is a front elevational view of the sprocket member in accordance with the present invention.

A toothed power transmission device and in particular a sprocket member embodying the concept of the present invention is indicated generally by the reference number 10 on the attached drawings. Sprocket member 10 includes a centrally disposed web portion 12 and a plurality of cold formed teeth 14. The manner in which the teeth 14 may be cold formed will be discussed later. The teeth 14 have laterally extending continuous cold formed working surfaces 16. The sprocket 10 is adapted for operative connection with a power train such as being attached to a rotatable power shaft (not shown). The sprocket member 10 may be provided with a centrally disposed hole 18 for this purpose.

Figure 2:
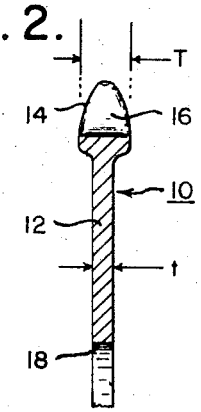
FIG. 2 is a partial sectional view of the sprocket member of FIG. 1 taken along line 2—2.
Figure 3:
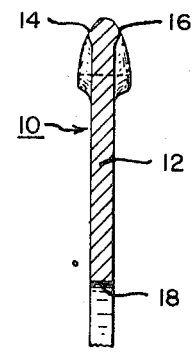
FIG. 3 is a partial sectional view of the sprocket member of FIG. 1 taken along line 3—3.

As can be best seen in FIGS. 1 through 3, the laterally extending continuous cold formed working surface 16 has a thickness T, which is wider than the thickness t of the web portion 12. The laterally extending continuous cold formed working surface 16 is like a continuous band or ribbon of steel and defines the continuous working surface of all of the teeth 14 of the sprocket member 10.

It is apparent from the above that by so providing a toothed power transmission device and in particular a sprocket member in accordance with the present invention that a number of beneficial and utilitarian advances in the state of the art are achieved. In particular, by so providing a sprocket member in accordance with the present invention, in which the working teeth are completely cold forged, an improved overall metal structure is achieved. This improvement in the metal structure will directly improve both the performance and life characteristics of the sprocket member. This is primarily due to the improved metallic grain flow pattern which tends to resist deformation under applied operational loads. Mechanical tests of sprocket tooth strength have indicated that a sprocket member tooth in accordance with the present invention is at least 30 percent stronger than an equivalent conventional cut sprocket tooth.

Figure 4:
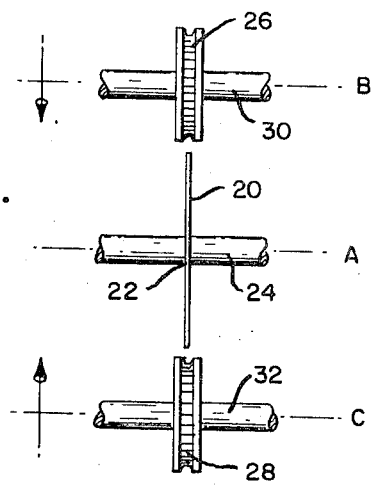
FIG. 4 is a partial top view of an example of an apparatus to practice the method in accordance with the present invention.

As can be seen in FIG. 4, the teeth 14 of the sprocket member 10 can be cold formed in several ways depending upon a number of parameters. One type of apparatus capable of achieving the above results is as generally disclosed in FIG. 4. Essentially the method of manufacturing the sprocket member 10 comprises the steps of selecting a substantially circular blank 20 having a center hole 22, mounting the blank at its center hole 22 on a rotatable mandrel 24, rotating the blank with rotating forming tools 26 and 28, contacting the forming tools with the blank to completely cold form finished teeth on the blank, whereby the metal of the blank contacted by the forming tools flows both axially and radially to form the laterally extending continuous cold form working service 16 as shown in FIGS. 1 through 3.

A starting blank or disc 20 may be typically circular in shape and formed with a center hole which may be equal in size to the final shaft size hole as specified by the appropriate U.S.A. Standards. It may be selected from a number types of suitable steel or metals such as for example A1S1-1117 Steel, 1020 carbon steel or the like. With respect to the hole size, it should be appreciated that it is not critical to the cold forming operation, and if desired and economically feasible, the hole can be re-sized after the sprocket teeth are formed on the periphery of the blank.

As mentioned before, the blank may be mounted upon a rotatable work shaft or mandrel 24 at its center hole 22 and be properly supported thereon by using collets or the like. The blank 20 may be fixedly attached to the work shaft 24 in various manners. In some modes it may be desirable to rotate the blank alone keeping the shaft stationary. However, the preferred mode is to mechanically or otherwise fixedly attach the blank 20 to the work shaft 24 such that it rotates with the shaft.

The axis A of rotation of the work shaft 24 will preferably remain unchanged during the cold forming operation. However, the axes B and C of the shafts 30 and 32 of the rotating forming tools 26 and 28 respectively will preferably change in that the tools 26 and 28 will be moved radially inwardly toward the blank 20 such that they each contact the blank 20. The shafts 30 and 32 of the forming tools 26 and 28 respectively as well as the work shaft 24 may each be suitably powered by power means (not shown) such as an electric motor, or a hydraulic motor, and may be phased in a time relationship with respect to each other by suitable gearing means (also not shown). The shafts 30 and 32 can be driven in synchronization with shaft 24 or independent thereof. The preferred forming technique includes the provision of driving the work shaft 24 in a timed relationship to the forming tool shafts 30 and 32.

The actual tooth forming operation will depend generally upon the configuration of the forming tools 26 and 28 and the mode of powering the various shafts 24, 30 and 32 during the tooth forming operation.

For example, the forming tools could be in the form of rack dies rather than the typical circular dies. The rack dies could be brought into contact with the blank and form the teeth thereon. This could generally be achieved by laterally displacing the rack and allowing the blank to rotate as a pinion between the rack dies. An obvious variation of this concept could comprise the provision of a single long rack die rather than two cooperative rack dies.

As mentioned before, typically the forms or dies would be circular in nature and would rotate on drive shafts which are timed in synchronization with each other. If two dies or forming tools are used they would obviously contact the blanks at the outer perimeter and penetrate the blank at a controlled rate such that the teeth are formed after the blank rotates at least one half of a revolution. This might generally be described as an infeed process. Obviously one of the forming members 26 could be omitted. In this case, the teeth on the blank 20 would be formed after the blank rotated at least one complete revolution.

A further variation of this approach is the addition of three or more dies or forming members. In this case, the forming members would have to be rotated synchronously with respect to each other and the blank 20 would be rotated at a rate of 1/N revolutions; where N equals the number of forming tools or dies used.

Yet another variation of the above mentioned forming technique might include the provision of maintaining the blank stationary or allowing it to rotate slowly while the forming members are rotated in a planetary motion about the blank. This type of motion could be typically accomplished with either one or more forming tools or dies.

It can be seen from the above described forming techniques that the teeth of the sprocket member can be formed in a "one-step operation." In certain instances, however, it may be desirable to form the teeth of the sprocket member using a series of successive tools or dies at for example a series of work stations or at the same station. This may be appropriate for the formation of particularly large pitch sprocket teeth.

The forming tools could also be in the form of a tooth segment or a series of multiple teeth. These forming tools could be plunged into contact with a stationary blank and then be retracted. The blank could then be indexed to a new position for a repeat of the axial plunge of the forming tool. In this technique the teeth could either be partially or fully formed with each tool plunge and of course more than one forming tool plunge is possible before the blank is indexed.

It should be apparent from the above that other cold forging techniques such as swaging, forging or cold rolled forming could be described. However, the preferred technique employs two circular forming tools 26 and 28 rotated on shafts 30 and 32 respectively. The shafts 30 and 32 being driven by a timed synchronized relation with each other and with the work shaft 24.

After the teeth on the blank 20 are completely formed the finished sprocket could be removed from the work shaft 24 and a new blank could be indexed or inserted in its place. This step, of course, could be accomplished by suitable automation techniques as are well known in the art. Additionally, it should be pointed out that a multiplicity of blanks could be formed at the same time. Further finishing operations are unnecessary when manufacturing a sprocket member in accordance with the present invention.

Accordingly, the method of manufacturing a power toothed transmission device and in particular a sprocket member in accordance with the present invention results in a number of distinct advantages over the prior art.

One such advantage is the substantial material savings resulting from the aforementioned manufacturing method. A substantial amount of material is saved because a reduced thickness blank may be used in the present method to form a full size tooth. Experiments have indicated that material saving of approximately 50 percent over conventional methods is typical.

Another direct advantage of using a thinner blank is that it permits penetration into the forming die and axial flow of the metal simultaneously which reduces the stresses in the forming tool or die. This results in better tooth conformity of the sprocket and longer tool or die life.

Material is also saved by cold forming a working tooth on the blank. The metal that is displaced both radially and axially by the forming tool fills the voids in the forming tool. Therefore, very little metal is lost in the process. Accordingly, the forming method enables the formed material to flow in a plastic manner.

Another advantage over the prior art is that the above method results in an improved surface finish on the sprocket teeth. This improved surface finish is caused by the burnishing action of the forming die and the blank. This manifests itself in improved wear resistant characteristics both for the sprocket and the associated chain with which it meshes. It is well known that a substantial amount of wear on power transmission products is caused by surface irregularities. These irregularities cause considerable wear during so called break-in periods. In contrast, a cold form tooth in accordance with the present invention has relatively few surface irregularities.

Another advantage of the method in accordance with the present invention is that it results in a sprocket member having improved hardness. A sprocket member as above described will have all its surfaces, which are in contact with its associated chain, cold worked. This will accordingly result in increased surface hardness. Starting either with hot worked or cold worked or annealed blanks, the cold forging action needed to produce the teeth also produces compressive stresses on the working surface of the tooth which increases its hardness. The improved surface hardness results in improved performance and wear resistant characteristics. The magnitude and depth of the surface hardness will differ in accordance with the blank material, its initial hardness and grain size, as well as the rate of deformation used to form the teeth.

The terms and expressions as used above are used as terms of description and not of limitation, there being no intention of excluding such equivalents of the invention described, or of the portions thereof, as fall within the scope of the claims.

What is claimed is:

1. A method of manufacturing a sprocket member adapted to operably mesh with a sprocket chain comprising the steps of selecting a substantially circular blank having a center hole, mounting said blank at its center hole on a rotatable mandrel, rotating said blank with rotating forming tools, contacting said forming tools with said blank to completely cold form finished teeth on said blank, whereby the blank material so contacted by said forming tools cold flows both axially and radially to form a laterally extending cold formed working surface, said laterally extending cold formed working surface is wider than said blank and defines the continuous working surface of all the teeth of said sprocket member.

2. A method of manufacturing a sprocket member as defined in claim 1, wherein the step of rotating said blank includes rotating said blank in synchronization with said forming tools, there being two forming tools each having teeth forming means on their periphery to completely cold form said teeth on said blank.

3. A method of manufacturing a sprocket member as defined in claim 1, wherein said forming tools rotate in opposite directions and are positioned on opposite sides of said blank and laterally contacting said blank.

4. A toothed power transmission device comprising a centrally disposed web portion, completely cold formed teeth on the periphery of said web portion, said teeth having a laterally extending continuous cold formed working surface.

5. A toothed power transmission device as defined in claim 4, wherein said device is a toothed circular sprocket member, said sprocket member having a centrally disposed circular hole for mounting on a shaft member.

6. A sprocket member as defined in claim 5, wherein said laterally extending continuous cold formed working surface is wider than said web portion and defines the continuous working surface of all the teeth of said sprocket member.

7. A method of manufacturing a power toothed transmission device comprising the steps of selecting a blank, mounting said blank on a fixture, contacting at least one forming tool with said blank to completely cold form finish teeth on said blank whereby the blank material so contacted by said forming tools cold flows both axially and radially to form a laterally extending cold formed working surface.

* * * * *